A. T. HAY.
Improvement in Reduction of Ores, &c.

No. 133,099.  Patented Nov. 19, 1872.

WITNESSES

INVENTOR
Abraham T. Hay.
By Wells W. Leggett
Attorney

UNITED STATES PATENT OFFICE.

ABRAHAM T. HAY, OF BURLINGTON, IOWA.

IMPROVEMENT IN THE REDUCTION OF ORES, &c.

Specification forming part of Letters Patent No. 133,099, dated November 19, 1872.

*To all whom it may concern:*

Be it known that I, ABRAHAM T. HAY, of Burlington, in the county of Des Moines and State of Iowa, have invented certain new and useful Improvements in Reduction of Ores, Purification of Metals, &c.; and I do hereby declare that the following is a full, clear, and exact description thereof, that will enable others skilled in the art to which it appertains to make and use the same, reference being had to the accompanying drawing and to the letters of reference marked thereon which form a part of this specification.

Figure 1:
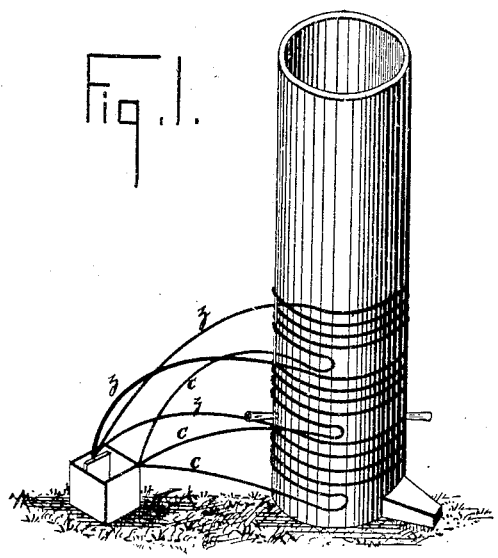
Figure 2:
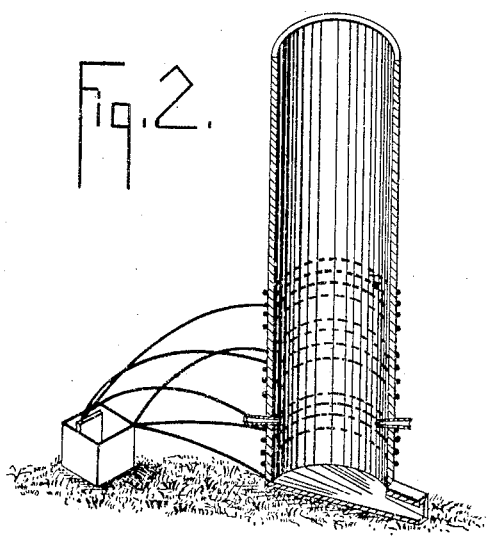

In the drawing, Figure 1 is a representation of a furnace for reducing ores, refining metals, &c., and may be of any contour externally as well as internally. Fig. 2 is vertical section of the same.

$c\ z\ c\ z$ are wires, which, starting from one pole of a battery, coil around the furnace A several times, and finally terminate at the other pole of the battery B, forming a closed circuit, and inclosing within the helix a portion of or the entire reduction-chamber, so that any substance contained therein forms a magnetic core when a current of electricity is passed through the coils. The entire chamber may be inclosed in one coil or helix, or there may be three or more separate and distinct helices. Thus three wires may start from the pole Z, the first be made to coil around and embrace only the zone of fusion; the second may likewise inclose and embrace only the zone of carburation; and the third similarly embrace only the zone of reduction, the wire in each coil terminating separately at the pole C of the battery. Other coils still may be passed around other zones, as that of heating and that of combustion. These coils are all so arranged, relatively, that they may be united so as to form one coil; or, two of them may be operated in one direction, while the current in the other or others may be reversed; or so that a portion of the chamber may be taken from the direct influence of a coil by detaching its wire from the poles $c\ z$.

I do not limit myself to any particular number of coils; nor to their relative arrangements; nor to uniformity of direction of the currents; nor do I confine myself to passing the coils around the outside of the furnaces; but must be understood as claiming, broadly, the use of a coil in such a manner, in connection with any vessel for heating and reducing ores or minerals, as to cause the substance acted upon to form all or a part of the magnetic core, and it matters not whether it be a crucible, retort, open hearth cupola, or other furnace where heat is used for the purpose of reduction, melting, or purification of ores or metals, the same natural laws being applicable in all cases. Heat promotes chemical affinity; chemical action sets free electricity; and electricity developes magnetism, and upon this latter phenomenon depends in a great measure the effects produced upon metals and minerals undergoing reduction or purification.

By the use of this magnetic appliance we are enabled to promote reduction, fusion, carburation, and produce, uniformly, metallic products, (which are free from the usual impurities imparted from coal or contained in ores or metals,) including grades of carburets of iron heretofore unknown, that are very valuable in the manufacture of wrought-iron, and production of fine steel. As for instance, first, by means of this magnetic appliance we may use from twenty-five to fifty per cent. of ore with pig-metal or scrap, and produce a uniform casting directly from the cupola. Second, Iron Mountain, Missouri, ore may be mixed with pig or scrap in the proportion of one part pig to five of ore, and ranging to one of metal and three of ore, which, when poured into open molds sponges up, and purifies itself of all foreign matter except carbon, and we get a heavy product, (a silver-bright high carburet,) that rings equal to the best bar of cast-steel. Third, when either Iron Mountain, Shepherd Mount, or Pilot Knob, Missouri, and perhaps other iron ores are used alone in connection with a small percentage of limestone, we obtain a light molten solution that crystallizes into a dark, brittle, magnetic, high carburet of iron, that may be remelted in a crucible or open hearth, at a temperature below the welding-heat of iron. These two latter products, heretofore unknown, are very valuable when used in connection with the manufacture of wrought-iron and steel. Fourth, pig and scrap metal rolled in flour of sulphur including free sulphur mixed with the coal used, under the influence of the above magnetic appliance, in a cupola gives a uniform soft gray iron product.

I do not confine myself to any particular kind of electrical apparatus for generating electricity; nor do I confine myself to any particular ores, nor combinations of ores and metals; but must be understood as claiming in the broadest sense the use of the coil when made to inclose the substance acted upon, substantially as set forth.

Having therefore fully described my invention, what I claim as new, and desire to secure by Letters Patent, is—

1. The use of a magnetic coil or helix around a cupola, blast-furnace, or other contrivance used for the reduction of ores or purification of metals.

2. The products obtained from a cupola, blast-furnace, or other contrivance used for reduction and purification of metallic ores, by submitting the same while undergoing reduction or purification to the influence of a magnetic coil of which the molten matter forms the core.

In testimony that I claim the foregoing I have hereunto set my hand.

ABRAHAM T. HAY.

Witnesses:
    WELLS W. LEGGETT,
    EDM. F. BROWN.